United States Patent Office 2,881,183
Patented Apr. 7, 1959

2,881,183

RESOLUTION OF DL-LYSINE

Edgar C. Britton and Halbert C. White, Midland, Mich., assignors to The Dow Chemical Company, Midland, Mich., a corporation of Delaware No Drawing. Application October 1, 1956
Serial No. 612,938

11 Claims. (Cl. 260—309.5)

This invention concerns the resolution of DL-lysine. More particularly it concerns a method of reacting DL-lysine with N-carbamoyl-L-glutamic acid or its inner condensation product, L-5-hydantoinpropionic acid, whereby a preponderance of the corresponding L-lysine salt is formed, and isolating and decomposing said salt to give L-lysine and the acid, which acid can be recycled for reuse.

Lysine is one of the essential amino acids. It occurs in various high grade proteins as L-lysine, the isomer which can be metabolized by humans. D-lysine, a component of the DL-lysine which is obtained by synthetic means, can not be utilized as an amino acid. It is desirable that L-lysine be separable from its racemate so that foods deficient in L-lysine can be fortified and upgraded therewith.

In accordance with this invention, it has now been discovered that N-carbamoyl-L-glutamic acid or its inner condensation product, L-5-hydantoinpropionic acid can be reacted in aqueous medium with DL-lysine in equimolar proportions and up to a 10 percent excess of said resolving acids, hereinafter designated as "substantially equimolar proportions," to form a preponderance of a salt of L-lysine and the aforementioned acids. These salts can be isolated and decomposed to give L-lysine and the acid component, which acid can be recycled for reuse. The by-product D-lysine can be racemized and recycled in this process.

In practice, DL-lysine, advantageously as an aqueous solution and preferably as a concentrated aqueous solution, is reacted with a substantially equimolar proportion of N-carbamoyl-L-glutamic acid or of L-5-hydantoinpropionic acid, an L-lysine salt thereof is precipitated with a lower monohydric alcohol, and the precipitated L-lysine salt is separated from the mother liquor. Several methods are available for decomposing such a salt to L-lysine and the corresponding free acid and recovering such L-lysine. For example, the salt can be dissolved in water to form an aqueous solution, advantageously containing about 10 percent of said salt, said salt solution can then be reacted with a cation exchanging agent to decompose and chemically absorb the L-lysine and to liberate the corresponding acid, and the absorbed L-lysine replaced and eluted from the cation exchanging agent with dilute ammonium hydroxide. If desired, the lysine solution so obtained can be evaporated to dryness and the L-lysine recovered. Alternatively, the L-lysine solution can be concentrated to about 50 to 75 percent solids to remove water and ammonia, the solution so obtained can be adjusted to a desired pH of about 5 with a mineral acid such as hydrochloric acid, and a lower monohydric alcohol can be added thereto to crystallize a mineral acid salt of L-lysine. Also, a mineral acid such as HCl can be used in isolating L-lysine·HCl from its salts with N-carbamoyl-L-glutamic acid and L-5-hydantoinpropionic acid by decomposing the latter and fractionally crystallizing the N-carbamoyl-L-glutamic acid or L-5-hydantoinpropionic acid and then precipitating L-lysine·HCl with a lower monohydric alcohol. By a concentrated solution of DL-lysine in water is meant one having at least 50 percent by weight of lysine up to a saturated solution thereof, and preferably between 50 and 75 percent of lysine, and by a lower monohydric alcohol is meant a monohydric alcohol having no more than 3 carbon atoms, of which methanol is preferred. Proportions by weight between 30 and 70 parts alcohol to 70 to 30 parts water are advantageously used in precipitating the L-lysine salts. Temperature of reaction between L-lysine and the resolving acids is not critical, and may range between 0° C. and reflux temperature. The order of addition of the alcohol to precipitate the L-lysine salts of N-carbamoyl-L-glutamic acid and of L-5-hydantoinpropionic acid is not important, i.e., the requisite amount may be added with one or both of the reactants or may be added after the reaction.

The following examples illustrate ways in which the invention has been practiced.

*Example 1*

A quantity of 69 ml. of an aqueous solution containing 0.25 g. mole of DL-lysine was added to 0.26 g. mole of L-5-hydantoinpropionic acid. A quantity of 250 ml. of methanol was then added, the reaction medium was seeded with the L-lysine salt of L-5-hydantoinpropionic acid and stirring was continued for 4 hours. The precipitated salt so obtained was filtered and washed with methanol to give 36.2 g. of salt having a melting point of 198°–200° C. and an $(\alpha)_D^{25}$ of $-36.2°$ in water. The yield was 91 percent, L-isomer basis. A quantity of 9.48 g. of the L-lysine salt was dissolved in 100 ml. of water and was decomposed by passing it through a column of 25 g. of a sulfonated styrene-divinylbenzene cation exchanging copolymer resin in the acid form, eluting the L-lysine with dilute ammonium hydroxide, concentrating the L-lysine solution to a solids content of about 10 percent, adjusting its pH to 5 with hydrochloric acid, and crystallizing L-lysine hydrochloride therefrom by the addition of methanol. There was obtained 4.65 g. of L-lysine hydrochloride, assaying 97 percent L-lysine by specific rotation in 1 N hydrochloric acid. The overall yield was 78 percent.

*Example 2*

A quantity of 9.5 grams (0.05 mole) of N-carbamoyl-L-glutamic acid was added to 21.5 ml. of an aqueous solution containing 0.05 g. mole of DL-lysine. The solution was diluted to 75 ml. with water and 150 ml. of methanol was added plus a seed of L-lysine salt of N-carbamoyl-L-glutamic acid. After stirring the crystallizing medium at 25° C. for 18 hours, filtering, and washing the precipitate with methanol, 6.5 grams of L-lysine salt was obtained, having a melting point of 177°–180° C. and an $(\alpha)_D^{25}$ of $+10.2°$ in water. The salt was decomposed with a nuclearly sulfonated styrene-divinyl-benzene cation exchanging copolymer, as described in Example 1, to give an overall yield of 2.72 g. of L-lysine as the hydrochloride, assaying 98 percent L-lysine. The overall yield was 60 percent, based on the original L-lysine content of the racemic lysine.

*Example 3*

A quantity of 40 ml. of an aqueous solution containing 0.20 g. mole of DL-lysine was diluted with 20 ml. of water and 250 ml. of methanol. To this was added 36.5 g. (0.21 mole) of L-5-hydantoinpropionic acid and the resulting solution was seeded with the L-lysine salt of L-5-hydantoinpropionic acid. After four hours' stirring at room temperature, the product was filtered, washed with methanol and dried to give 28.1 g. of salt having an $(\alpha)_D^{25}$ of $-36.5°$ in water and a melting point of 197–199° C.

Example 4

A quantity of 20 ml. of an aqueous solution containing 0.10 mole of DL-lysine was diluted to 150 ml. with water, 300 ml. of methanol was added and then 19 g. (0.10 mole) of N-carbamoyl-L-glutamic acid. After seeding with the L-lysine salt of N-carbamoyl-L-glutamic acid and stirring for 18 hours at 25° C., the product was filtered to give 12.8 g. of salt having a melting point of 176–181° C. and an $(\alpha)_D^{25}$ of $+10.6°$ in water.

Example 5

A quantity of 3.36 g. (0.01 mole) of the L-lysine salt of N-carbamoyl-L-glutamic acid was decomposed with 5 ml. of 2 N HCl. After cooling in an ice bath, 1.55 g. (82 percent of theory) of N-carbamoyl-L-glutamic acid was recovered. By adding 30 ml. of denatured 95 percent ethanol to the filtrate, there was precipitated and recovered 1.68 g. (92 percent of theory) of L-lysine·HCl.

Example 6

A quantity of 3.18 g. (0.01 mole) of the L-lysine salt of L-5-hydantoinpropionic acid was likewise decomposed with 5 ml. of 2 N HCl to give 1.42 g. (82 percent of theory) of L-5-hydantoinpropionic acid upon cooling as in Example 5 and 1.60 g. (88 percent of theory) of L-lysine·HCl after subsequent precipitation with 30 ml. of denatured 95 percent ethanol, as in Example 5.

By-product D-lysine can be racemized and the resulting DL-lysine can be resolved, pursuant to the process of this invention. The following example illustrates the racemization of D-lysine.

Example 7

A quantity of 125 ml. of an aqueous D-lysine solution (0.485 mole mixture of 80 percent D-lysine and 20 percent L-lysine) and 170 ml. of 5 N sodium hydroxide (0.85 mole) was heated at 170–180° C./140–150 p.s.i.g. pressure for two hours. The caustic soda solution was then poured through a column of nuclearly sulfonated styrene-divinylbenzene copolymer in the acid form (1.75 moles). The column was eluted with dilute NH$_4$OH solution and washed with deionized water. The eluate and wash were combined and concentrated to give a 97 percent recovery of DL-lysine, assaying 53.3 percent D-isomer by specific rotation.

The DL-lysine so-obtained can be resolved pursuant to the practice of this invention, as previously indicated. It is apparent, therefore, that D-lysine per se and in DL-lysine can ultimately be converted to L-lysine, and the L-lysine recovered by a practice of this invention.

What is claimed is:

1. As new compounds, members of the group consisting of L-lysine·N-carbamoyl-L-glutamic acid and L-lysine·L-5-hydantoinpropionic acid.
2. L-lysine·N-carbamoyl-L-glutamic acid.
3. L-lysine·L-5-hydantoinpropionic acid.
4. A process for recovering L-lysine from racemic lysine which comprises reacting substantially equimolar proportions in aqueous solution of DL-lysine and a member of the group consisting of N-carbamoyl-L-glutamic acid and L-5-hydantoinpropionic acid, precipitating an L-lysine salt of said acids with a monohydric alcohol having no more than 3 carbon atoms, separating said L-lysine salt from the reaction medium, and decomposing and recovering L-lysine therefrom.
5. The process of claim 4 wherein the by-product D-lysine is racemized and recycled.
6. The process of claim 4 wherein the L-lysine salt is decomposed with hydrochloric acid, the precipitant resolving acid is fractionally crystallized and removed from the decomposition medium and L-lysine·HCl is precipitated therefrom with ethanol.
7. A process for recovering L-lysine from racemic lysine which comprises reacting in aqueous solution substantially equimolar proportions of DL-lysine and a member of the group consisting of N-carbamoyl-L-glutamic acid and L-5-hydantoinpropionic acid, precipitating an L-lysine salt of said acids with a monohydric alcohol having no more than 3 carbon atoms, separating said L-lysine salt from the reaction medium, decomposing an aqueous solution of said lysine salt with a cation exchanging agent in the acid form, eluting the absorbed lysine from said resin with dilute ammonium hydroxide, adjusting said L-lysine solution to a pH of about 5 with a mineral acid and precipitating the mineral acid salt of L-lysine by adding to said solution a monohydric alcohol having no more than 3 carbon atoms.
8. The process of claim 7 wherein the proportion of alcohol present in both precipitation steps is between 20 and 80 parts by weight of alcohol to 80 to 20 parts of water.
9. The process of claim 8 wherein the monohydric alcohol is methanol.
10. The process of claim 7 wherein the lysine eluate is first concentrated to a solids content between 50 and 75 percent.
11. The process of claim 7 wherein the cation exchangting agent is a sulfonated styrene-divinylbenzene copolymer.

References Cited in the file of this patent

UNITED STATES PATENTS

| | | |
|---|---|---|
| 2,556,907 | Emmick | June 12, 1951 |
| 2,657,230 | Rogers | Oct. 27, 1953 |

FOREIGN PATENTS

| | | |
|---|---|---|
| 1,035,997 | France | Apr. 22, 1953 |

OTHER REFERENCES

Koritz et al.: Chem. Abstracts, vol. 48, col. 10,494 (1954).